United States Patent [19]

Saatkamp

[11] Patent Number: 5,213,724
[45] Date of Patent: May 25, 1993

[54] PROCESS AND APPARATUS FOR DETERMINING THE RATE AT WHICH MATERIAL IS RECEIVED BY AN EXTRUDER FROM A FEED CONTAINER

[75] Inventor: Richard Saatkamp, Lengerich, Fed. Rep. of Germany

[73] Assignee: Windmöller & Hölscher, Lengerich, Fed. Rep. of Germany

[21] Appl. No.: 859,568

[22] Filed: Mar. 27, 1992

[30] Foreign Application Priority Data

Mar. 27, 1991 [DE] Fed. Rep. of Germany ....... 4110135

[51] Int. Cl.⁵ .............................................. B29B 7/66
[52] U.S. Cl. .................................... 264/37; 264/40.4;
366/76; 366/141; 366/152; 366/159; 425/148
[58] Field of Search .................... 264/37, 40.4, 328.17,
264/328.18, 328.19, 211.21; 425/1.35, 140, 148,
217; 222/133, 134, 77, 56; 366/76, 134, 141,
151, 152, 159

[56] References Cited

U.S. PATENT DOCUMENTS

| | | | |
|---|---|---|---|
| 4,013,745 | 3/1977 | Brinkmann et al. | 264/40.4 |
| 4,340,347 | 7/1982 | Robertson | 264/37 |
| 4,486,100 | 12/1984 | Endo et al. | 366/76 |
| 4,498,783 | 2/1985 | Rudolph | 222/56 |
| 4,812,048 | 3/1989 | Neumann et al. | 366/76 |
| 4,867,343 | 9/1989 | Ricciardi et al. | 222/56 |
| 5,110,521 | 5/1992 | Moller | 264/40.4 |

OTHER PUBLICATIONS

Ricciardi et al., "Dry-Solids Metering Gravimetric Feeders", *Plastics Technology*, Sep. 1976, pp. 61-67.

Primary Examiner—Jill L. Heitbrink
Attorney, Agent, or Firm—Keck, Mahin & Cate

[57] ABSTRACT

A process of determining the rate at which plastic granules are received by an extruder form a feed container having an outlet which opens into the inlet of the extruder, in which process granules are continuously fed to a supply container and consecutive charges of granules are intermittently fed to the feed container, the feed container is weighed before or at the beginning of or after or at the end of its filling operation, the time is measured which between the filling operations is required to withdraw the material in the amount which has been determined by the weighing operations, and the flow rate of the material is calculated from the amounts of material which have been received from the feed container in the measured intervals of time. A uniform feeding of material into the extruder will be ensured if granules and marginal strip material are supplied to the cyclone like container. The supply container is substantially used only as a mixing container and opens into a charge-holding container, which is provided between the supply container and the feed container. The granules of at least one component thereof and recycled marginal strips are continuously fed to the supply container. The feed container and the charge-holding container are weighed in intervals of time, and the feed rate of the granules of the at least one component is correspondingly increased or reduced when the measured total weight of the feed container and of the charge-holding container differs from a predetermined desired weight.

4 Claims, 2 Drawing Sheets

PROCESS AND APPARATUS FOR DETERMINING THE RATE AT WHICH MATERIAL IS RECEIVED BY AN EXTRUDER FROM A FEED CONTAINER

BACKGROUND OF THE INVENTION

1. Field of the Invention

This invention relates to a process of determining the weight rate at which plastic granules are received by an extruder from a feed container having an outlet which opens into the inlet of the extruder, in which process granules are continuously fed to a supply container and consecutive charges of granules are intermittently fed to the feed container, the feed container is weighed before or at the beginning of or after or at the end of its filling operation, the time is measured which between the filling operations is required to withdraw the material in the amount which has been determined by the weighing operations, and the flow rate of the material is calculated from the amounts of material which have been received from the feed container in the measured intervals of time. The invention relates also to an apparatus for carrying out that process.

2. Description of the Prior Art

Extruders for making, e.g., flat plastic sheeting are fed with plastic granules and/or regranulated plastic waste or shredded plastics through cyclonelike containers, from which the material is then withdrawn in dependence on the feed rate of the extruder. In such operation it is desired to determine the rate at which material is consumed in order to gain information on the output of the extruder or on the weight of the extruded plastic sheeting per linear meter. For instance, information on the weight of the extruded plastic sheeting per linear meter will permit a determination whether or not the thicknesses of the extruded sheeting are in the desired tolerance range. That determination is significant from an economical aspect because the plastic material employed is expensive and a production of sheeting having an excessive thickness will not only render the subsequent processing more difficult but will constitute an undesired waste of material.

A process of the kind described first hereinbefore will now be explained with reference to FIG. 2 of the drawing. In that process granules of different plastics are supplied through two metering devices 18, 19 to a cyclonelike container 16, which is provided with two level indicators 16' and 16". The upper level indicator 16' is associated with an upper limiting level and the lower level indicator 16" is associated with a lower limiting level. The metering devices 18, 19 consist, e.g., of screw feeders for withdrawing granules from supply containers and are turned on as soon as the lower level indicator 16" has indicated that the charge in the container 16 has decreased to the lower limiting level. The metering devices will be turned off as soon as the upper level indicator 16' has indicated that the upper limiting level has been reached. The output pipe of the container 16 protrudes into but does not contact a feed container 6. The outlet pipe contains a valve 12 for a controlled opening and closing of said pipe. By means of a balance 5, the feed container 6 is suspended from a bracket 3, which is connected to the extruder 1. Granules flow continuously from the feed container 6 through the inlet opening 8 into the extruder 1. The outlet pipe of the feed container 6 opens into the inlet opening 8 without contacting the extruder 1. As soon as the weight of the feed container 6 inclusive of its charge has decreased below a predetermined lower limit, the valve 12 is opened until a preset desired weight has been reached. Thereafter the valve 12 is closed. By a measurement of the time in which the amount that has been fed to the feed container 6 is withdrawn therefrom it is possible to determine the flow rate of granules through the extruder 1 in kg/ unit of time.

In the operation of that known apparatus, difficulties will arise if the cyclonelike container 16 is supplied not only with granules but also with marginal strip material, which has been obtained, e.g., in that the extruded sheeting has been trimmed at its edges and in a shredded form is recycled. That recycled marginal strip material is continuously obtained at a substantially constant rate as the extruded flat sheeting is continuously trimmed. But during the operation of the extruder the metering means 18, 19 for feeding granules to the container 16 will be turned off as soon as the level indicator 16' indicates that the upper limiting level has been reached. The metering devices 18 and 19 will remain turned off until the lower level indicator 16" indicates that the charge in the container 16 has been reduced to the lower limiting level. During that time the metering devices 18, 19 do not supply granules but marginal strip material is continuously supplied to the container 16 so that a cushioning layer of marginal strip material is formed above the descending granule layer. As a result, the marginal strip material cannot uniformly be mixed in the container 16 with the granules which have been supplied but in dependence on the different bulk densities and the different shapes of the material the withdrawing action of the screw conveyors and, as a result, the feed rates thereof will be different at different times.

SUMMARY OF THE INVENTION

It is an object of the invention to propose a process which is of the kind described first hereinbefore and which will ensure a uniform feeding of material into the extruder if granules and marginal strip material are supplied to the cyclonelike container.

In a process of the kind described first hereinbefore that object is accomplished in accordance with the invention in that the supply container is substantially used only as a mixing container and opens into a charge-holding container, which is provided between the supply container and the feed container, the granules of at least one component thereof and recycled marginal strips are continuously fed to the supply container, the feed container and the charge-holding container are weighed in intervals of time, and the feed rate of the granules of the at least one component is correspondingly increased or reduced when the measured total weight of the feed container and of the charge-holding container differs from a predetermined desired weight.

By the process in accordance with the invention it is ensured that in spite of the intermittent feeding of the feed container the total amount of the blend of granules and marginal strip material in the feed container and the charge-holding container will remain substantially constant so that the marginal strip material and the granules can be fed to the cyclonelike supply container at rates having an approximately constant ratio and will mix in said supply container at a substantially constant ratio. As a result, in the process in accordance with the invention the charge-holding container will be fed approximately at the rate at which material is withdrawn from the feed container so that the total amount of material stored in the charge-holding container and the feed container will remain substantially constant. On the other hand, if the charge is deficient or excessive this will be determined by the weighing operations performed in suitable intervals of time so that the feed rate of the granules can be correspondingly increased or reduced and a charge in an amount which will ensure a satisfactory operation can thus be provided. The changes of the velocity at which the granules of the at least one component are fed are so small that they will not result in disturbing changes of the ratio of the amounts of granules and of marginal strip material. For this reason the provision of the additional charge-holding container permits a weighing of the amounts which are intermittently fed to the feed container and a measuring of the times of withdrawal whereas that intermittent operation does not require an interruption of the continuous feeding of granules and marginal strip material; that continuous feeding will ensure an effective blending.

An apparatus for carrying out the process in accordance with the invention comprises a feed container, which is supported on or suspended from weighing means and is preceded by a supply container, which is preceded by at least one feeder for plastic granules, is characterized in accordance with the invention in that a charge-holding container, which is supported on or suspended from weighing means, is connected between the supply container and the feed container and has an inlet which receives the outlet of the supply container without contacting it, a feeder for continuously feeding marginal strip material opens into the supply container, the outlet pipe of the charge-holding conveyor is provided with a controllable valve, and means are provided for measuring the time between the times at which the valve is opened and closed.

If two feeder or more feeders for plastic granules open into the supply container, the ratio of the feed rates of said feeders will remain constant even in case of a change of the velocity at which the material is fed. From EP-A-394,869, for instance, it is known that in an operation in which a container is fed with at least two components by means of metering screw feeders for withdrawing said components from supply containers, the motors of said screw feeders may be operated at varying speeds having a fixed ratio, which corresponds to the mixing ratio, so that the mixing ratio determined by the speed ratio of the motors will remain constant even when speeds of the motors are changed to change the feed rates.

BRIEF DESCRIPTION OF THE DRAWING

An illustrative embodiment of the invention will now be explained in more detail with reference to.

DETAILED DESCRIPTION OF THE PREFERRED EMBODIMENT

Figure 1:
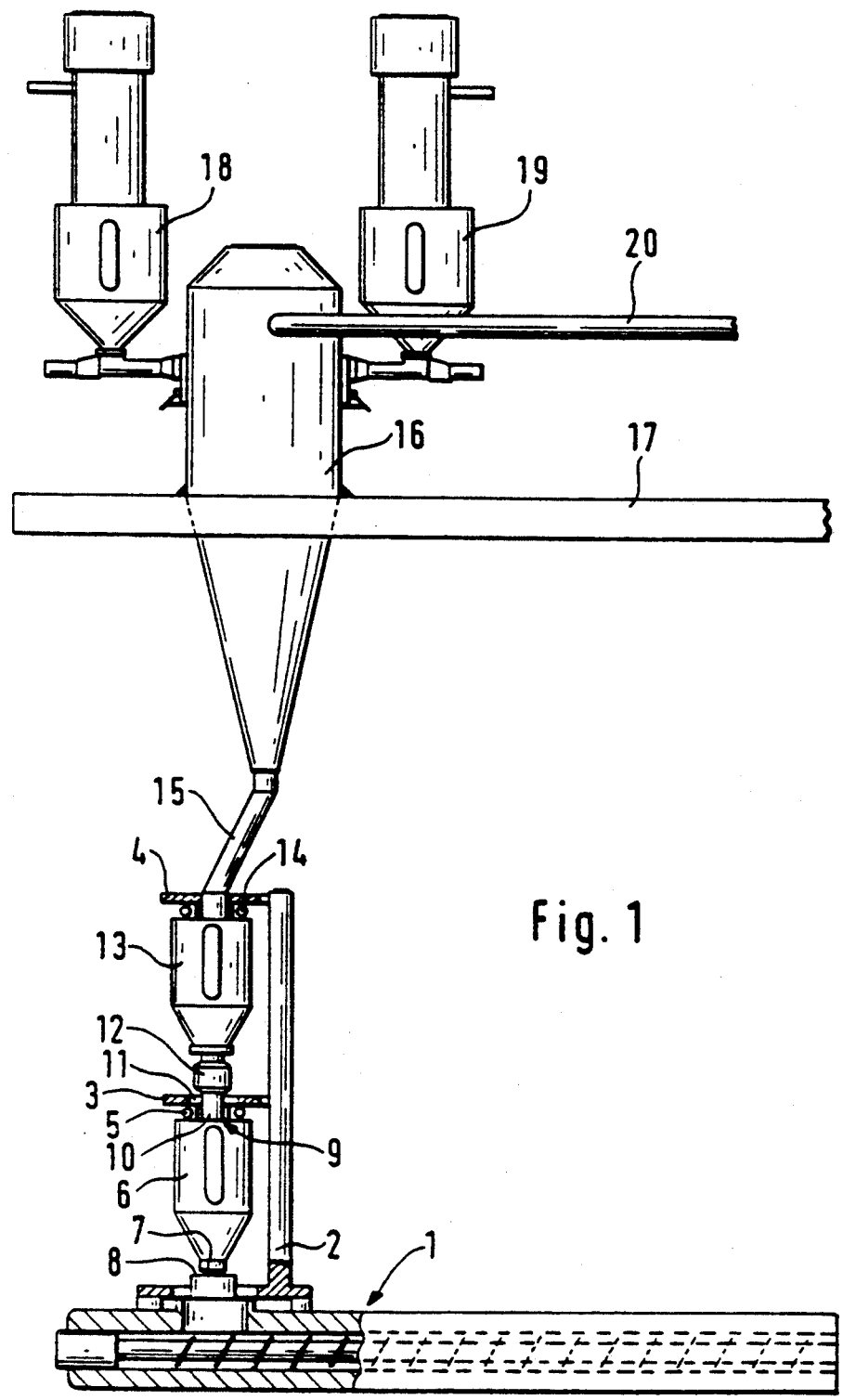
FIG. 1, which is a schematic side elevation view showing an extruder comprising a container which precedes the inlet opening of the extruder and is suspended from weighing means, and a charge-holding container, which precedes the first-mentioned container and is also suspended from weighing means.
Figure 2:
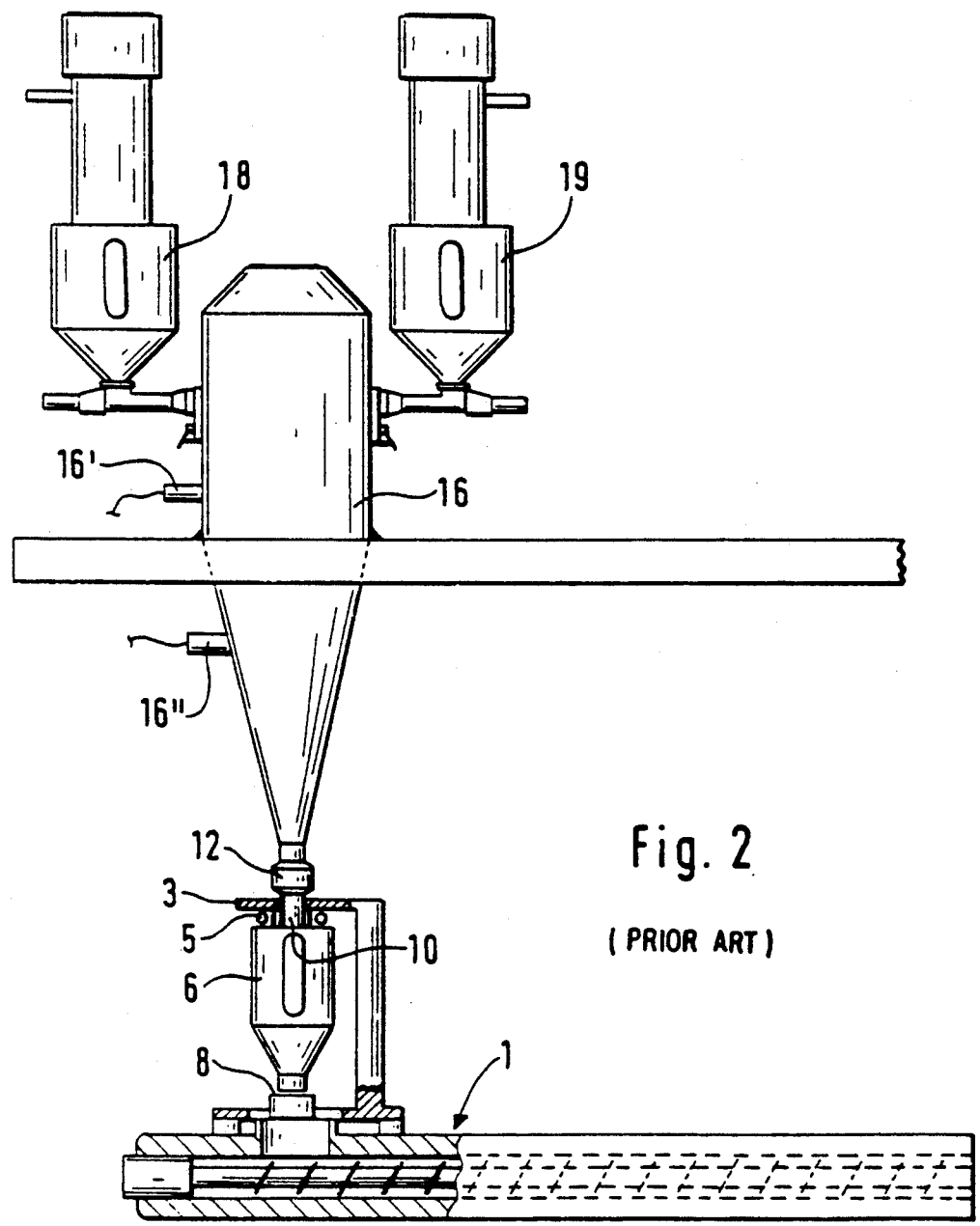
FIG. 2 is a schematic side elevation view of an extruder of the prior art.

FIG. 1 shows the receiving end of an extruder 1, to which a carrier 2 is connected by screws. That carrier comprises two cantilever brackets 3 and 4. A feed container 6 is suspended by a balance 5 from the carrying arm 3 and at its bottom end has an outlet opening 7, which is always open and is disposed over the inlet opening 8 of the extruder 1 so that material can continuously flow from the feed container 6 into the inlet opening 8 of the extruder. In addition to the outlet opening 7 the feed container 6 has at its top an inlet opening 9, which receives the outlet pipe 10 of the charge-holding container 13. The outlet pipe 10 extends through an aperture 11 in the bracket 3 without contacting the latter. A controlled valve 12 is provided in the outlet pipe 10 of the charge-holding container 13 so that the outlet pipe 10 can be opened and closed. The charge-holding container 13 is suspended from the bracket 4 by means of a balance 14. The inlet opening at the top of the funnel-shaped charge-holding container 13 receives a supply pipe 15, which constitutes the outlet of the cyclonelike mixing container 16. The container 16 is mounted on a pedestal 17 and is fed with granules by two metering devices 18, 19 and with marginal strip material through a line 20.

At intervals of one second the weight of container 6 together with its content (charge) is measured so that an exact determination on the amount of material which has been processed by the extruder per unit of time can be made. When the weight of container 6 together with its content reaches a predetermined lower limiting value, valve 12 is opened until the weight of container 6 together with its content has reached an upper limiting value. Then valve 12 is closed again. Said control is carried out independent of the control of the speed of the screws of the metering devices 18 and 19 which, as explained below, operates on the basis of the total weight of containers 6 and 13.

When the feed container has been charged, e.g., completely filled, with granules and marginal strip material before the plant has been started, the total weights of the containers 6 and 13 are summed up to determine a certain weight x. The thus determined weight x will be the desired weight, which is to be maintained through the operation. For that purpose the total weight of the containers 6 and 13 is cyclically determined and compared with the desired weight x. When a deviation is detected, the speeds of the screws of the metering devices 18 and 19 are changed correspondingly. That mode of operation will ensure that the ratio of fresh granules to recycled strip material will be approximately constant.

I claim:

1. A process of determining the weight rate at which process granules are received by an extruder from a feed container having an outlet which opens into the inlet of the extruder, in which process granules are continuously fed to a supply container and consecutive charges of granules are intermittently fed to the feed container, the feed container is weighed before or at the beginning of or after or at the end of its filling operation, the time between filling operation required to withdraw feed material from the feed container in an amount which has been determined by the weighing operations is measured, and the flow rate of the material is calculated from a total of the amounts of material which have been received from the feed container in the measured intervals of time, characterized in that the supply container is substantially used only as a mixing container and opens into a charge-holding container, which is provided between the supply container and the feed container, granules of at least one component and recycled marginal strips are continuously fed to the supply container and then fed to the charge-holding container and the feed container, the feed container and the charge-holding container are weighed at intervals of time, and the feed rate of the granules of the at least one component being fed to the supply container is correspondingly increased or reduced when the measured total weight of the feed container and of the charge-holding container differs from a predetermined desired weight.

2. A process according to claim 1, characterized in that two or more feeders for plastic granules open into the supply container and the ratio of the feed rates of said feeders will remain constant even in case of a change of the velocity at which the material is fed.

3. In the extension of plastic sheeting from an extruder wherein the extruder is supplied with a mixture of granular material and recycled strip material cut from the sheeting, a method of supplying the extruder with said mixture comprising supplying the granular material and strip material to a supply container to form said mixture, continuously delivering the mixture from the supply container into a charge holding container, delivering charges of the mixture intermittently from the charge holding container to an extruder feed container through a cyclically operated valve, supplying the extruder continuously with mixture from the feed container, determining quantities of the mixture used by the extruder by cyclically weighing the feed container and the charge holding container, comparing the combined weight of the containers with a predetermined weight and controlling feed rate of granular material into the supply container accordingly.

4. An apparatus for determining the weight rate at which process granules are received by an extruder from a feed container having an outlet which opens into the inlet of the extruder, in which process granules are continuously fed to a supply container and consecutive charges of granules are intermittently fed to the feed container, the feed container is weighed before or at the beginning of or after or at the end of its filling operation, the time between filling operations required to withdraw feed material from the feed container in an amount which has been determined by the weighing operations is measured, and the flow rate of the material is calculated from a total of the amounts of material which have been received from the feed container in the measured intervals of time, wherein the supply container is substantially used only as a mixing container and opens into a charge-holding container, which is provided between the supply container and the feed container, the granules of at least one component and recycled marginal strips are continuously fed to the supply container and then fed to the charge-holding container and the feed container, the feed container and the charge-holding container are weighed in intervals of time, and the feed rate of the granules of the at least one component being fed to the supply container is correspondingly increased or reduced when the measured total weight of the feed container and of the charge-holding container differs from a predetermined desired weight, said apparatus comprising a feed container, which is supported on or suspended from weighing means and is preceded by a supply container, which is preceded by at least one feeder for plastic granules, characterized in that a charge-holding container, which is supported on or suspended from weighing means, is connected between the supply container and the feed container and has an inlet which receives the outlet of the supply container without contacting it, a feeder for continuously feeding marginal strip material opens into the supply container, the outlet pipe of the charge-holding conveyor is provided with a controllable valve, and means are provided for measuring the time interval between the time at which the valve is opened and closed.

* * * * *